(12) United States Patent
Hasegawa et al.

(10) Patent No.: US 10,998,801 B2
(45) Date of Patent: May 4, 2021

(54) COMPRESSOR

(71) Applicant: FUJITSU GENERAL LIMITED, Kanagawa (JP)

(72) Inventors: Tomooki Hasegawa, Kanagawa (JP); Takashi Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 69 days.

(21) Appl. No.: 16/339,245

(22) PCT Filed: Oct. 27, 2017

(86) PCT No.: PCT/JP2017/038970
§ 371 (c)(1),
(2) Date: Apr. 3, 2019

(87) PCT Pub. No.: WO2018/100946
PCT Pub. Date: Jun. 7, 2018

(65) Prior Publication Data
US 2020/0044522 A1     Feb. 6, 2020

(30) Foreign Application Priority Data

Nov. 30, 2016 (JP) .............................. JP2016-232624

(51) Int. Cl.
| | |
|---|---|
| *H02K 1/06* | (2006.01) |
| *H02K 15/02* | (2006.01) |
| *F04B 17/03* | (2006.01) |
| *F04B 27/08* | (2006.01) |
| *H02K 1/27* | (2006.01) |

(Continued)

(52) U.S. Cl.
CPC ........... *H02K 15/028* (2013.01); *F04B 17/03* (2013.01); *F04B 27/0873* (2013.01); *H02K 1/2706* (2013.01); *H02K 5/04* (2013.01); *H02K 7/003* (2013.01)

(58) Field of Classification Search
CPC ............ H02K 1/148; H02K 1/16; H02K 1/06; H02K 1/14; H02K 1/146
See application file for complete search history.

(56) References Cited

U.S. PATENT DOCUMENTS

| | | | |
|---|---|---|---|
| 7,271,512 B2 * | 9/2007 | Lee ....................... | D06F 37/304 310/216.105 |
| 8,941,947 B2 * | 1/2015 | Showa ............... | G11B 19/2009 360/99.08 |

FOREIGN PATENT DOCUMENTS

| | | |
|---|---|---|
| JP | H01-152092 U | 10/1989 |
| JP | H06-245438 A | 9/1994 |

(Continued)

*Primary Examiner* — Dang D Le
(74) *Attorney, Agent, or Firm* — Paratas Law Group, PLLC

(57) ABSTRACT

A compressor includes a shaft, a motor unit that causes the shaft to rotate, a compressor unit that compresses a refrigerant according to rotation of the shaft, and a housing that stores therein the shaft, the motor unit, and the compressor unit, wherein the housing and the motor unit are joined by welding in a plurality of welding areas, the motor unit includes a rotor that is fixed to the shaft, and a stator core that surrounds the rotor, a plurality of core sheets are superimposed in the stator core and the stator core includes a plurality of teeth around which a coil is wounded and a plurality of swaging fixing areas where swaging areas fix the core sheets mutually, and the welding areas are formed in only positions corresponding to the swaging fixing areas.

5 Claims, 9 Drawing Sheets

(51) Int. Cl.
*H02K 5/04* (2006.01)
*H02K 7/00* (2006.01)

(56) References Cited

FOREIGN PATENT DOCUMENTS

| | | |
|---|---|---|
| JP | H11-178293 A | 7/1999 |
| JP | 2001-182681 A | 7/2001 |
| JP | 2005-253271 A | 9/2005 |
| JP | 2010-081735 A | 4/2010 |
| JP | 2010-236422 A | 10/2010 |
| JP | 2011-030297 A | 2/2011 |
| JP | 2011-055576 A | 3/2011 |
| JP | 2014-233135 A | 12/2014 |
| JP | 2017-034819 A | 2/2017 |

\* cited by examiner

COMPRESSOR

CROSS REFERENCE TO PRIOR APPLICATION

This application is a National Stage Patent Application of PCT International Patent Application No. PCT/JP2017/038970 (filed on Oct. 27, 2017) under 35 U.S.C. § 371, which claims priority to Japanese Patent Application No. 2016-232624 (filed on Nov. 30, 2016), which are all hereby incorporated by reference in their entirety.

FIELD

The disclosed technology relates to a compressor.

BACKGROUND

A hermetically sealed compressor in which a compressor unit and a motor unit are housed in a sealed housing is known. The compressor unit compresses a refrigerant using rotary power that is generated by the motor unit. A stator core of the motor unit is formed by superimposing a plurality of electromagnetic steel sheets ("core sheets" below) and is fixed to the housing (see Patent Literatures 1 to 4).

CITATION LIST

Patent Literature

Patent Literature 1: Japanese Laid-open Patent Publication No. 2001-182681
Patent Literature 2: Japanese Unexamined Utility Model Application Publication No. 01-152092
Patent Literature 3: Japanese Laid-open Patent Publication No. 11-178293
Patent Literature 4: Japanese Laid-open Patent Publication No. 2010-236422

SUMMARY

Technical Problem

When the stator core is fixed to the housing by welding, however, a yoke of the stator core may deform due to heat of welding. There is thus a problem in that the deformation changes the inner diameter of the stator and accordingly causes unevenness in the air gap between the stator and a rotor or increases the magnetic resistance and thus increases the loss of the magnetic circuit.

The disclosed technology was made in view of the above-described aspect and an object of the disclosed technology is to provide a compressor in which a stator core is prevented from deforming.

Solution to Problem

According to an aspect of an embodiment, a compressor includes a shaft, a motor unit that causes the shaft to rotate, a compressor unit that compresses a refrigerant according to rotation of the shaft, and a housing that stores therein the shaft, the motor unit, and the compressor unit, wherein the housing and the motor unit are joined by welding in a plurality of welding areas, the motor unit includes a rotor that is fixed to the shaft, and a stator core that surrounds the rotor, a plurality of core sheets are superimposed in the stator core and the stator core includes a plurality of teeth around which a coil is wounded and a plurality of swaging fixing areas where swaging areas fix the core sheets mutually, and the welding areas are formed in only positions corresponding to the swaging fixing areas.

Advantageous Effects of Invention

The disclosed compressor enables prevention of deformation of the stator core.

DESCRIPTION OF EMBODIMENTS

Figure 1:
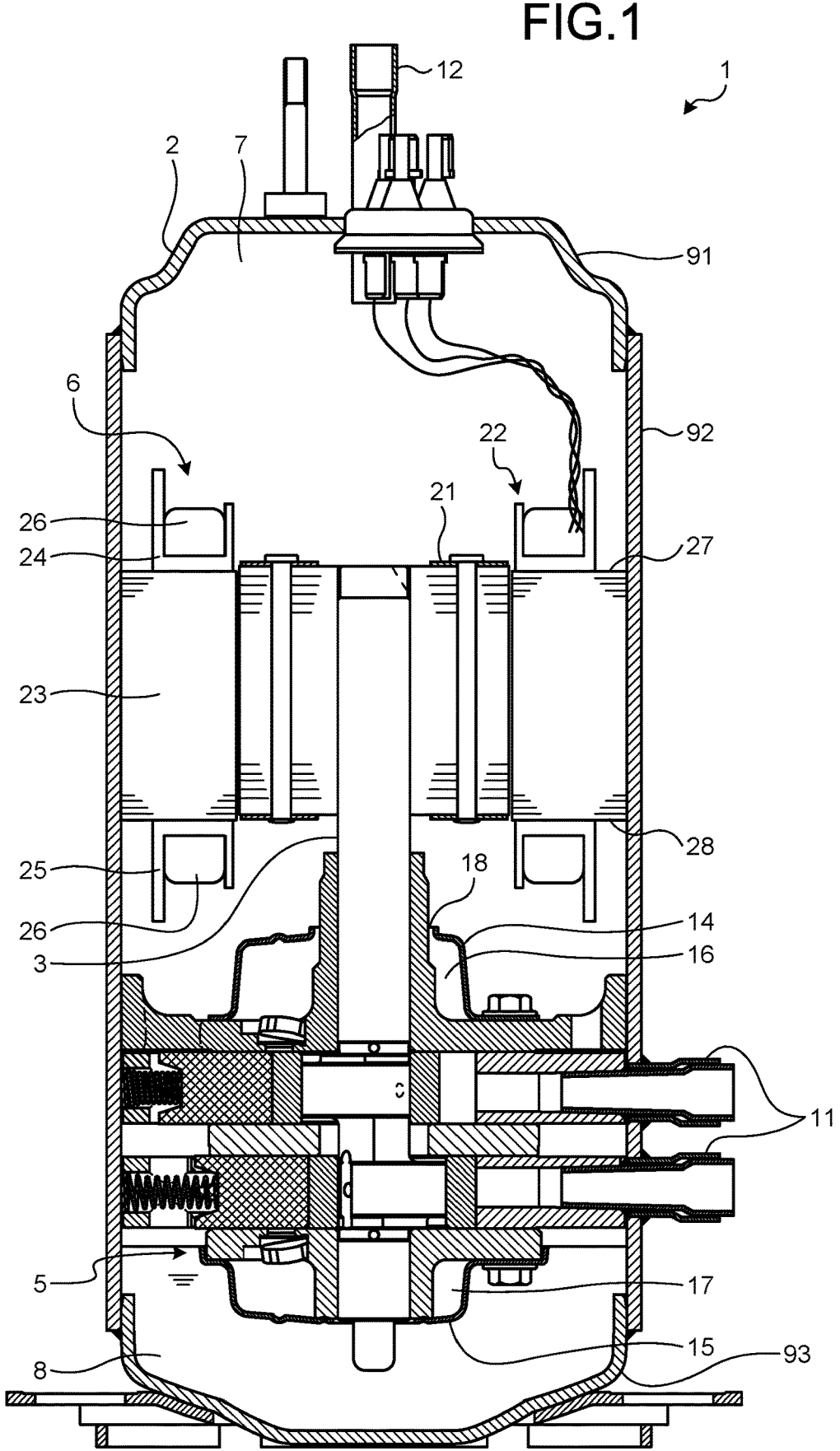
FIG. 1 is a longitudinal cross-sectional view of a compressor of first embodiment.

Compressors according to embodiments disclosed herein will be described below with reference to the drawing. The following descriptions do not limit the disclosed technology. In the following descriptions, the same numbers are assigned to the same components and redundant descriptions will be omitted.

First Embodiment

FIG. 1 is a longitudinal cross-sectional view of a compressor of first embodiment. As illustrated in FIG. 1, a compressor 1 includes a housing 2, a shaft 3, a compressor unit 5, and a motor unit 6. The housing 2 includes an upper cover 91, a shell 92, and a lower cover 93. The shell 92 is formed in an approximately cylindrical shape. In the housing 2, the upper cover 91 closes one end of the shell 92 and the lower cover 93 closes the other end of the shell 92, thereby forming a sealed internal space 7. The internal space 7 is formed in an approximately cylindrical shape. The compressor 1 is formed such that, when the housing 2 is placed longitudinally on a horizontal surface, the axis of the cylinder of the internal space 7 is parallel with the vertical direction. In the housing 2, a lubricant reservoir 8 is formed in a lower part of the internal space 7. In the lubricant reservoir 8, a lubricant that allows the compressor unit 5 to move smoothly is stored. Suction pipes 11 and a discharge pipe 12 are connected to the housing 2. The shaft 3 is formed in a rod-like shape and is arranged in the internal space 7 in the housing 2 with one end of the shaft 3 being arranged in the lubricant reservoir 8. The shaft 3 is supported on the housing 2 rotatably on a rotation axis that is parallel to the axis of the cylinder that is formed by the internal space 7.

The compressor unit 5 is arranged in a lower part of the internal space 7 and is arranged above the lubricant reservoir 8. The compressor 1 further includes an upper muffler cover 14 and a lower muffler cover 15. The upper muffler cover 14 is arranged above the compressor unit 5 in the internal space 7. In the upper muffler cover 14, an upper muffler chamber 16 is formed. The lower muffler cover 15 is arranged under the compressor unit 5 and above the lubricant reservoir 8 in the internal space 7. In the lower muffler cover 15, a lower muffler chamber 17 is formed. The lower muffler chamber 17 communicates with the upper muffler chamber 16 via a communication path that is formed in the compressor unit 5 (not illustrated in the drawings). A compressed refrigerant ejection hole 18 is formed between the upper muffler cover 14 and the shaft 3. The upper muffler chamber 16 communicates with the internal space 7 via the compressed refrigerant ejection hole 18.

The shaft 3 rotates and accordingly the compressor unit 5 compresses the refrigerant that is supplied from the suction pipes 11 to the internal space 7 and supplies the compressed refrigerant to the upper muffler chamber 16 and the lower muffler chamber 17. The refrigerant has compatibility with the lubricant.

The motor unit 6 is arranged above the compressor unit 5 in the internal space 7. The motor unit 6 includes a rotor 21 and a stator 22. The rotor 21 is formed in an approximately cylindrical shape and is fixed to the shaft 3. The stator 22 is formed in an approximately cylindrical shape, is arranged to surround the rotor 21, and is fixed to the housing 2. The stator 22 includes a stator core 23, an upper insulator 24, a lower insulator 25, and a coil 26. The upper insulator 24 is arranged in an upper part of the stator 22 and is closely adhered to an upper end 27 of the stator 22. The lower insulator 25 is arranged in a lower part of the stator 22 and is closely adhered to a lower end 28 of the stator 22.

Stator Core

Figure 2:
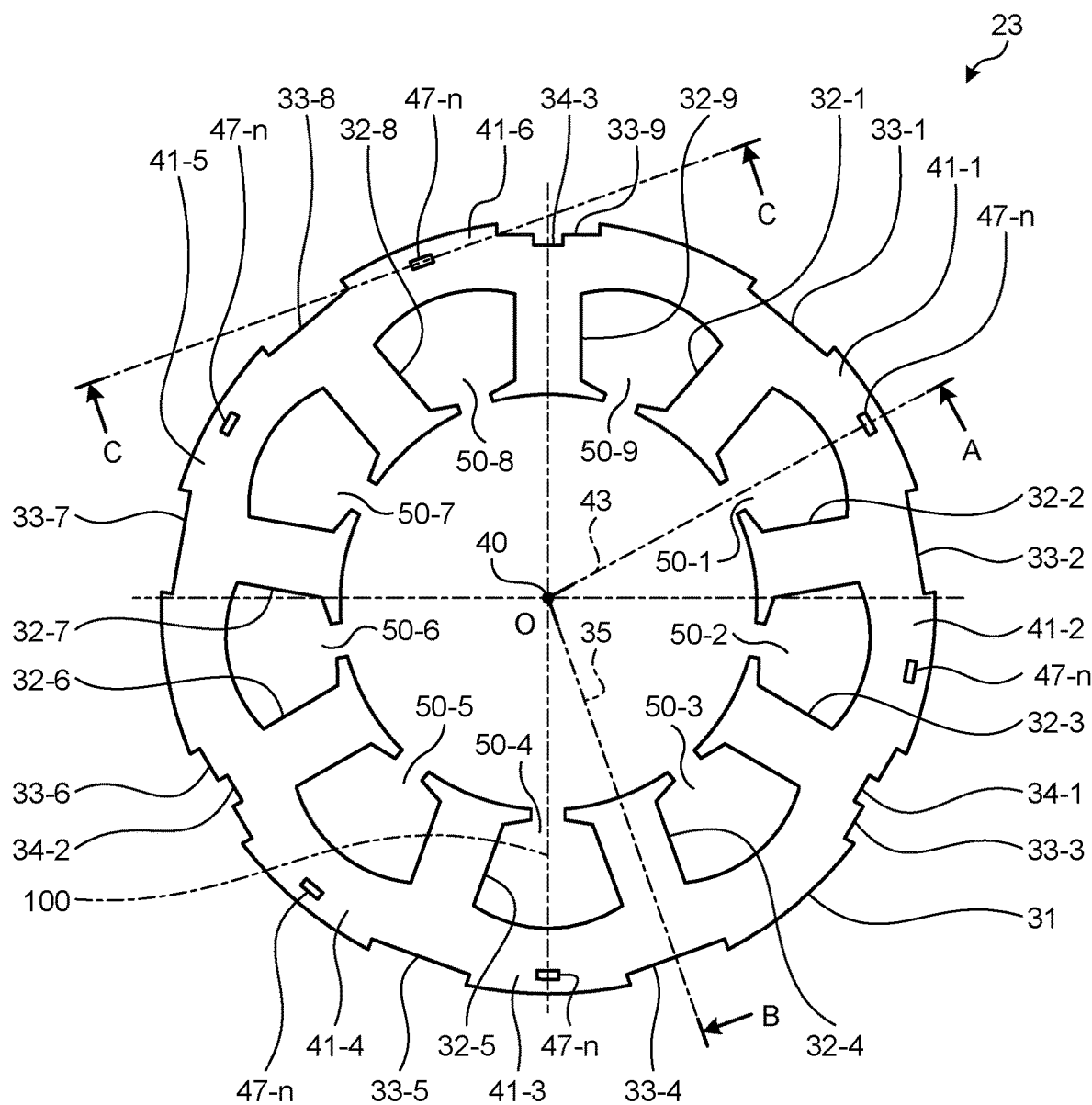
FIG. 2 is a top view of a stator core.

FIG. 2 is a top view of the stator core. The stator core 23 of the example is formed by superimposing n core sheets. The top view of the stator core in FIG. 2 is a view of the stator core 23 viewed from the side (the upper surface side) on which the n-th core sheet (the last core sheet) is superimposed. As illustrated in FIG. 2, the stator core 23 includes a yoke 31 and teeth 32-1 to 32-9. The yoke 31 is formed in an approximately cylindrical shape. For example, the fourth tooth 32-4 out of the teeth 32-1 to 32-9 overlaps a virtual plane 35 that overlaps an axis 40 of the cylinder of the yoke 31 and protrudes from the inner circumferential surface of the yoke 31 toward the axis 40. The axis 40 overlaps the rotary axis on which the shaft 3 rotates in the compressor 1. As the fourth tooth 32-4 does, a given i-th tooth 32-$i$ ($i=1, 2, 3, \ldots, 9$) out of the teeth 32-1 to 32-9 protrudes from the inner circumferential surface of the yoke 31 toward the axis 40. The teeth 32-1 to 32-9 are formed to be arranged at equal intervals of 40 degrees on the inner circumferential surface of the yoke 31.

In the stator core 23, a plurality of cutouts 33-1 to 33-9 are further formed. The cutouts 33-1 to 33-9 are formed on the outer circumferential surface of the yoke 31, which is the circumferential surface opposed to the inner wall of the housing 2, and correspond respectively to the teeth 32-1 to 32-9. For example, the cutout 33-4 corresponding to the fourth tooth 32-4 out of the cutouts 33-1 to 33-9 is arranged in an area on the circumferential surface of the yoke 31, which is an area near the fourth teeth 32-4. In other words, the cutout 33-4 is formed such that the cutout 33-4 overlaps the virtual plane 35 that overlaps the fourth teeth 32-4. An i-th cutout 33-$i$ corresponding to the given i-th teeth 32-1 out of the cutouts 33-1 to 33-9 is arranged in an area on the outer circumferential surface of the yoke 31, which is an area near the i-th tooth 32-$i$. In other words, the i-th cutout 33-$i$ is formed to overlap a virtual plane that overlaps the i-th tooth 32-$i$.

In the stator core 23, a plurality of positioning cutouts 34-1 to 34-3 are further formed in the yoke 31. The first positioning cutout 34-1 out of the positioning cutouts 34-1 to 34-3 is formed at the bottom of the cutout 33-3 out of the cutouts 33-1 to 33-9. The second positioning cutout 34-2 out of the positioning cutouts 34-1 to 34-3 is formed at the bottom of the cutout 33-6 out of the cutouts 33-1 to 33-9. A third positioning cutout 34-3 out of the positioning cutouts 34-1 to 34-3 is formed at the bottom of the cutout 33-9 out of the cutouts 33-1 to 33-9.

In the stator core 23, the teeth 32-1 to 32-9 are formed and accordingly a plurality of slots 50-1 to 50-9 are formed. The slots 50-1 to 50-9 are gaps in which the coil 26 is arranged and are formed between the teeth 32-1 to 32-9. The first slot 50-1 out of the slots 50-1 to 50-9 is formed between the first tooth 32-1 and the second tooth 32-2 out of the teeth 32-1 to 32-9. The second slot 50-2 out of the slots 50-1 to 50-9 is formed between the second tooth 32-2 and the third tooth 32-3 out of the teeth 32-1 to 32-9. The third slot 50-3 out of the slots 50-1 to 50-9 is formed between the third tooth 32-3 and the fourth tooth 32-4 out of the teeth 32-1 to 32-9. The fourth slot 50-4 out of the slots 50-1 to 50-9 is formed between the fourth tooth 32-4 and the fifth tooth 32-5 out of the teeth 32-1 to 32-9. The fifth slot 50-5 out of the slots 50-1 to 50-9 is formed between the fifth tooth 32-5 and the sixth tooth 32-6 out of the teeth 32-1 to 32-9. The sixth slot 50-6 out of the slots 50-1 to 50-9 is formed between the sixth tooth 32-6 and the seventh tooth 32-7 out of the teeth 32-1 to 32-9. The seventh slot 50-7 out of the slots 50-1 to 50-9 is formed between the seventh tooth 32-7 and the eighth tooth 32-8 out of the teeth 32-1 to 32-9. The eighth slot 50-8 out of the slots 50-1 to 50-9 is formed between the eighth tooth 32-8 and the ninth tooth 32-9 out of the teeth 32-1 to 32-9. The ninth slot 50-9 out of the slots 50-1 to 50-9 is formed between the ninth tooth 32-9 and the first tooth 32-1 out of the teeth 32-1 to 32-9.

In the yoke 31, a cut area 46 and swaging areas 47-2 to 47-$n$ are formed. Core sheets 45-1 to 45-$n$ are mutually fixed through the cut area 46 and the swaging areas 47-2 to 47-$n$. In the example, the spot where the cut area and the swaging areas 47-2 to 47-$n$ are formed in the yoke 31 is referred to as a swaging fixing area. In the example, six swaging fixing areas from a first swaging fixing areas 41-1 to a sixth swaging fixing area 41-6 are provided. The first swaging fixing area 41-1 out of the swaging fixing areas 41-1 to 41-6 is formed on the side of the outer circumference of the first slot 50-1 in the yoke 31. In other words, the first swaging fixing area 41-1 is formed such that a virtual line 43 connecting a given point contained in the first swaging fixing area 41-1 and the axis 40 intersects with the first slot 50-1. The second swaging fixing area 41-2 out of the swaging fixing areas 41-1 to 41-6 is formed on the side of the outer circumference of the second slot 50-2 in the yoke 31. The third swaging fixing area 41-3 out of the swaging fixing areas 41-1 to 41-6 is formed on the side of the outer circumference of the fourth slot 50-4 in the yoke 31. The fourth swaging fixing area 41-4 out of the swaging fixing areas 41-1 to 41-6 is formed on the side of the outer circumference of the fifth slot 50-5 in the yoke 31. The fifth swaging fixing area 41-5 out of the swaging fixing areas 41-1 to 41-6 is formed on the side of the outer circumference of the seventh slot 50-7 in the yoke 31. The sixth swaging fixing area 41-6 out of the swaging fixing areas 41-1 to 41-6 is formed on the side of the outer circumference of the eighth slot 50-8 in the yoke 31.

Figure 3:
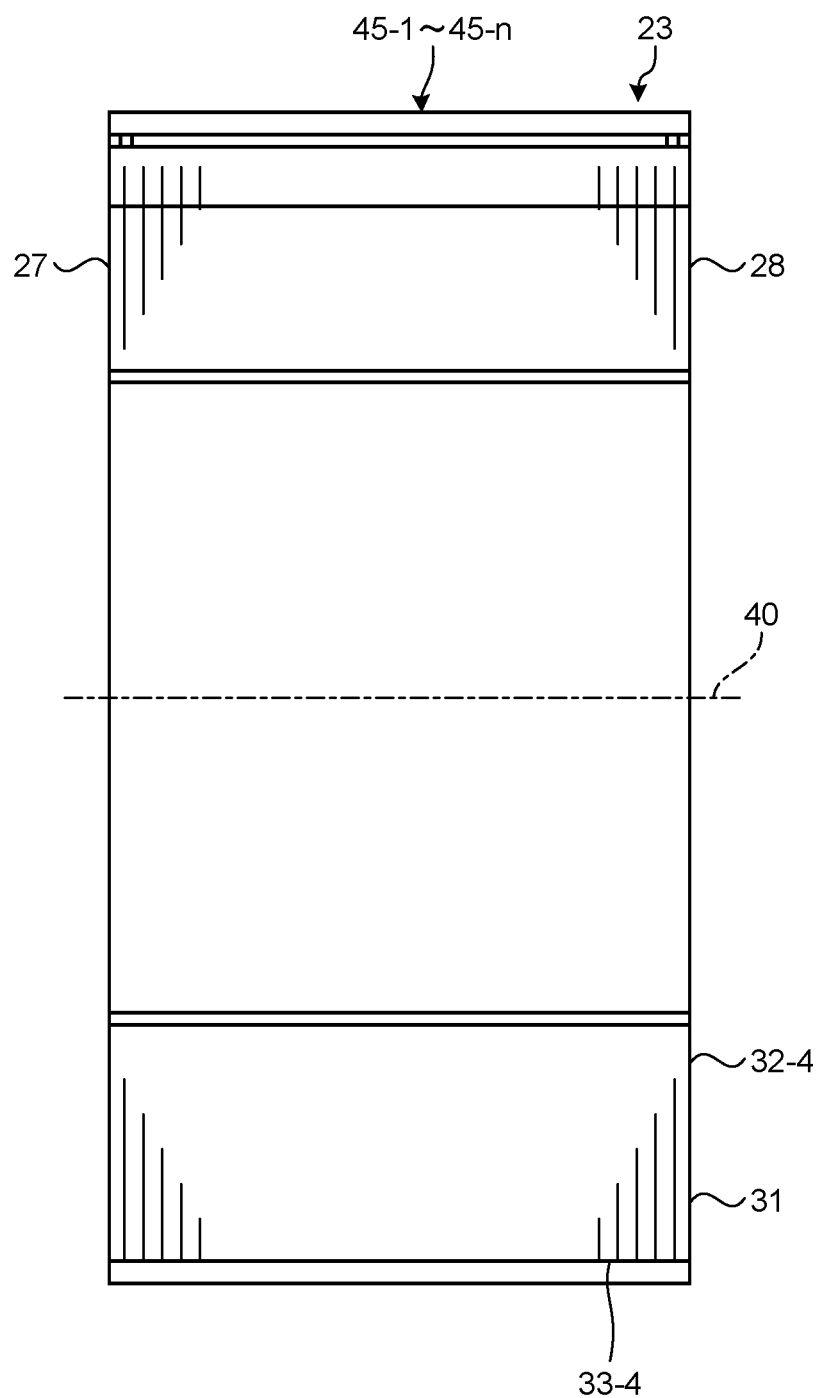
FIG. 3 is a cross-sectional view taken along the lines A-O and O-B in FIG. 2.

FIG. 3 is a cross-sectional view taken along the lines A-O and O-B. As illustrated in FIG. 3, the stator core 23 includes n core sheets 45-*a* to 45-*n*. Each of the core sheets 45-1 to 45-*n* is formed of a soft magnetic material, such as a silicon steel sheet, and is formed into a sheet. The stator core 23 is formed by superposing the n core sheets 45-1 to 45-*n*. The stator core 23 is formed of the core sheets 45-1 to 45-*n*, thereby reducing overcurrent that occurs in the stator core 23.

Figure 4:
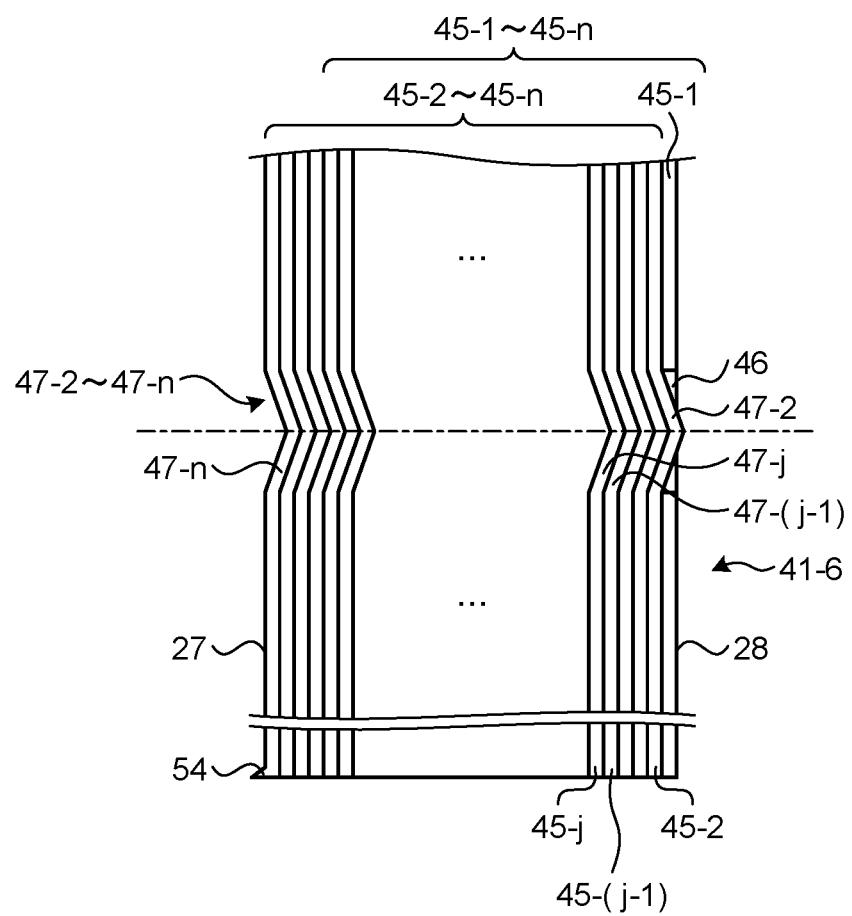
FIG. 4 is a cross-sectional view taken along the line C-C in FIG. 2.

FIG. 4 is a cross-sectional view taken along the line A-A. As illustrated in FIG. 4, the cut area 46 and the swaging areas 47-2 to 47-*n* are formed in the sixth swaging fixing area 41-6. The cut area 46 is formed in the core sheet 45-1 that forms the lower end 28 out of the core sheets 45-1 to 45-*n* and is formed as a hole that penetrates through the core sheet 45-1. The swaging areas 47-2 to 47-*n* are respectively formed in the core sheets 45-2 to 45-*n* excluding the core sheet 45-1. As illustrated in FIG. 4, the swaging area 47-*j* (j=2, 3, 4, ..., n) is formed by partly deforming a j-th core sheet 45*j* plastically. The swaging area 47-*j* is formed such that the surface of the core sheet 45-*j* on the side of the lower end 28 protrudes. In other words, the swaging area 47-*j* is formed such that a surface of the core sheet 45-*j* on the side of the upper end 27 is concave.

As illustrated in FIG. 4, the swaging area 47-2 of the second core sheet 45-2 is fitted to the cut area 46 that is formed in the first core sheet 45-1. The protrusion that is formed by the swaging area 47-*j* in the j-th core sheet is fitted to the concave that is formed by a swaging area, out of the swaging areas 47-2 to 47-*n*, that is formed in another sheet adjacent to the core sheet 45-*j* on the side of the lower end 28 (in other words, a (j−1)-th core sheet 45-(*j*−1)). As for the cut area 46 and the swaging areas 47-2 to 47-*n*, the swaging area 47-2 is fitted to the cut area 46 and the swaging areas 47-2 to 47-*n* are fitted to each other, thereby mutually fixing the area forming the sixth swaging fixing area 41-6 of the core sheets 45-2 to 45-*n*. In other words, in the sixth swaging fixing area 41-6, the core sheets 45-2 to 45-*n* are mutually positioned and the core sheets 45-2 to 45-*n* are mutually fixed.

As in the sixth swaging fixing area 41-6 illustrated in FIG. 4, in other swaging fixing areas (the first swaging fixing area 41-1 to the fifth swaging fixing area 41-5) of the stator core 23, a cut area and a plurality of swaging areas are fitted to each other and accordingly the core sheets 45-1 to 45-*n* are mutually positioned and the core sheets 45-1 to 45-*n* are mutually positioned (illustration omitted). In other words, in the stator core 23, the core sheets 45-1 to 45-*n* are mutually positioned via the swaging fixing areas 41-1 to 41-6 and the core sheets 45-1 to 45-*n* are mutually fixed. In other words, each of the swaging fixing areas is swaged and thus the core sheets 45-*a* to 45-*n* are mutually fixed.

In the stator core 23, a fine burr 54 may be formed. The burr 54 is formed on the edge of the upper end 27 and protrudes in the normal direction of the upper end 27.

Figure 5:
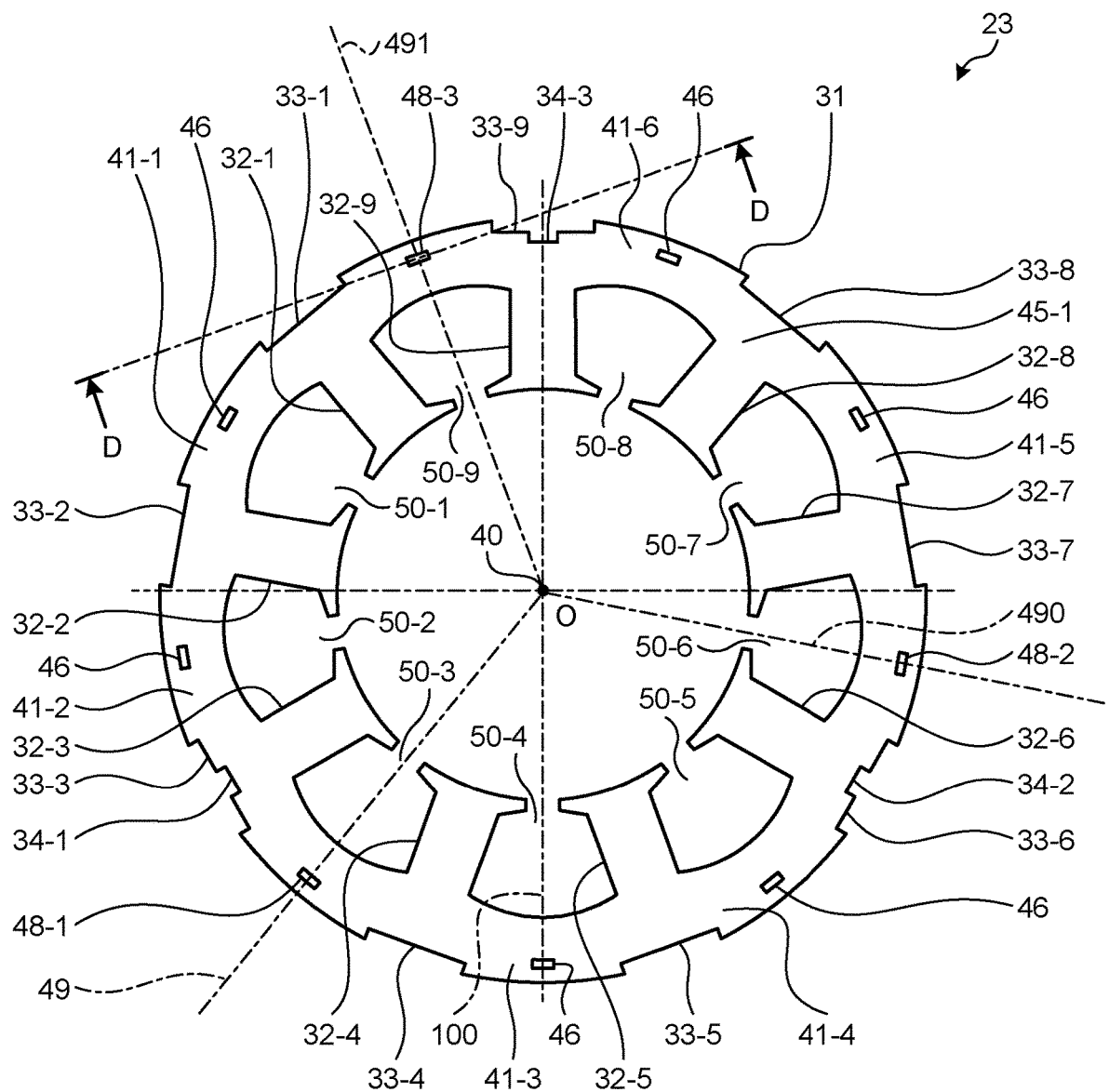
FIG. 5 is a bottom view of the stator core.

FIG. 5 is a bottom view of the stator core. In the core sheet 45-1, as illustrated in FIG. 5, dummy cut areas 48-1 to 48-3 are formed in addition to the cut areas 46. Each of the dummy cut areas 48-1 to 48-3 is formed as a hole that penetrates through the core sheet 45-1. The first dummy cut area 48-1 out of the dummy cut areas 48-1 to 48-3 is formed in an area near the third slot 50-3 in the yoke 31 and is formed such that a virtual line 49 connecting the first dummy cut area 48-1 and the axis 40 intersects with the third slot 50-3. The second dummy cut area 48-2 out of the dummy cut areas 48-1 to 48-3 is formed in an area near the sixth slot 50-6 in the yoke 31 and is formed such that a virtual line 490 connecting the second dummy cut area 48-2 and the axis 40 intersects with the sixth slot 50-6. The third dummy cut area 48-3 out of the dummy cut areas 48-1 to 48-3 is formed in an area near the ninth slot 50-9 in the yoke 31 and is formed such that a virtual line 491 connecting the third dummy cut area 48-3 and the axis 40 intersects with the ninth slot 50-9.

Figure 6:
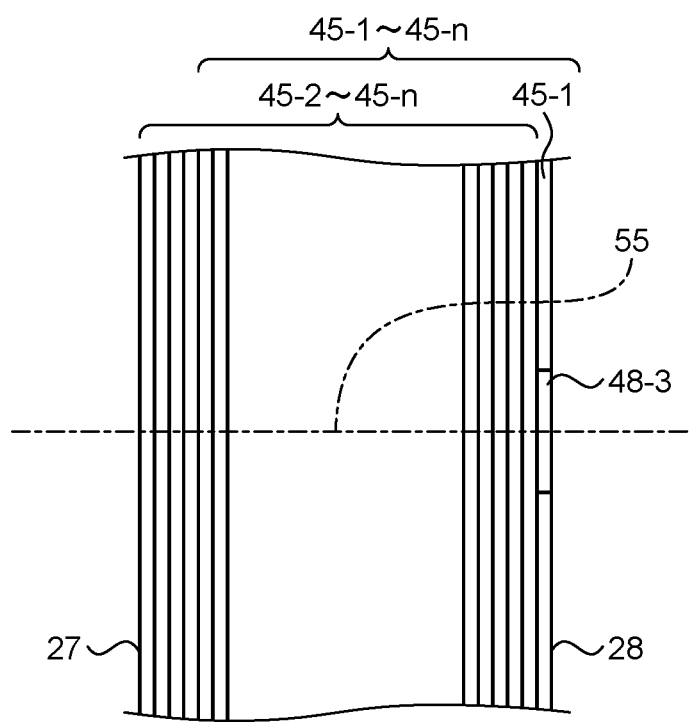
FIG. 6 is a cross-sectional view taken along the line D-D in FIG. 5.

FIG. 6 is a cross-sectional view taken along the line D-D in FIG. 5. As illustrated in FIG. 6, in each of the core sheets 45-2 to 45-*n*, an area intersecting with a straight line 55 that passes through the third dummy cut area 48-3 and is parallel to the axis 40 is formed flat. For this reason, the core sheets 45-2 to 45-*n* are not mutually fixed in the area where the third dummy cut area 48-3 is formed in the yoke 31 (the area near the sixth slot 50-9 in the yoke 31). Also as for an area where the first dummy cut area 48-1 is formed in the yoke 31, as in the area where the third dummy cut area 48-3 is formed in the yoke 31, the core sheets 45-2 to 45-*n* are formed flat. Also as for the area where the first dummy cut area 48-1 is formed in the yoke 31, as in the area where the third dummy cut area 48-3 is formed in the yoke 31, the core sheets 45-2 to 45-*n* are not fixed mutually. Also as for an area where the second dummy cut area 48-2 is formed in the yoke 31, as in the area where the third dummy cut area 48-3 is formed in the yoke 31, the core sheets 45-2 to 45-*n* are formed flat. Also as for the area where the second dummy cut area 48-2 is formed in the yoke 31, as in the area where the third dummy cut area 48-3 is formed in the yoke 31, the core sheets 45-2 to 45-*n* are not fixed mutually.

The stator core 23 is formed as described above an thus the positioning cutouts 34-1 to 34-3 and the swaging fixing areas 41-1 to 41-6 are arranged to have rotational symmetry of 120 degrees with respect to the axis 40. In other words, when the stator core 23 is turned about the axis 40 by 120 degrees, each of the positioning cutouts 34-1 to 34-3 is arranged to overlap the position in which any one of the positioning cutouts 34-1 to 34-3 is originally arranged. Furthermore, when the stator core 23 is turned about the axis 40 by 120 degrees, each of the swaging fixing areas 41-1 to 41-6 is arranged to overlap the position in which any one of the swaging fixing areas 41-1 to 41-6 is arranged originally.

The positioning cutouts 34-1 to 34-3 are arranged to have reflection symmetry with respect to planes each of which contains the axis 40 and that intersects with any one of the positioning cutouts 34-1 to 34-3. For example, the first positioning cutout 34-1 and the second positioning cutout 34-2 are arranged to have reflection symmetry with respect to a plane 100 that contains the axis 40 and that intersects with the third positioning cutout 34-3. On the other hand, the swaging fixing areas 41-1 to 41-6 are not arranged to have reflection symmetry with respect to the plane 100. For example, no swaging fixing area is arranged in a position enabling reflection symmetry with the sixth swaging fixing area 41-6 with respect to the plane 100.

Thus, for example, after the upper end 27 and the lower end 28 of the stator core 23 are reversed (in other words, after the stator core 23 is reversed vertically), when arrangement is performed such that the third positioning cutout 34-3 overlaps the position in which the third positioning cutout 34-3 is arranged originally, the sixth swaging fixing area 41-6 is not arranged in a position in which any one of the swaging fixing areas 41-1 to 41-6 is arranged originally. Similarly, each of the second and fourth swaging fixing areas 41-2 and 41-4 is not arranged in a position in which any one of the swaging fixing areas 41-1 to 41-6 is arranged originally.

Figure 7:
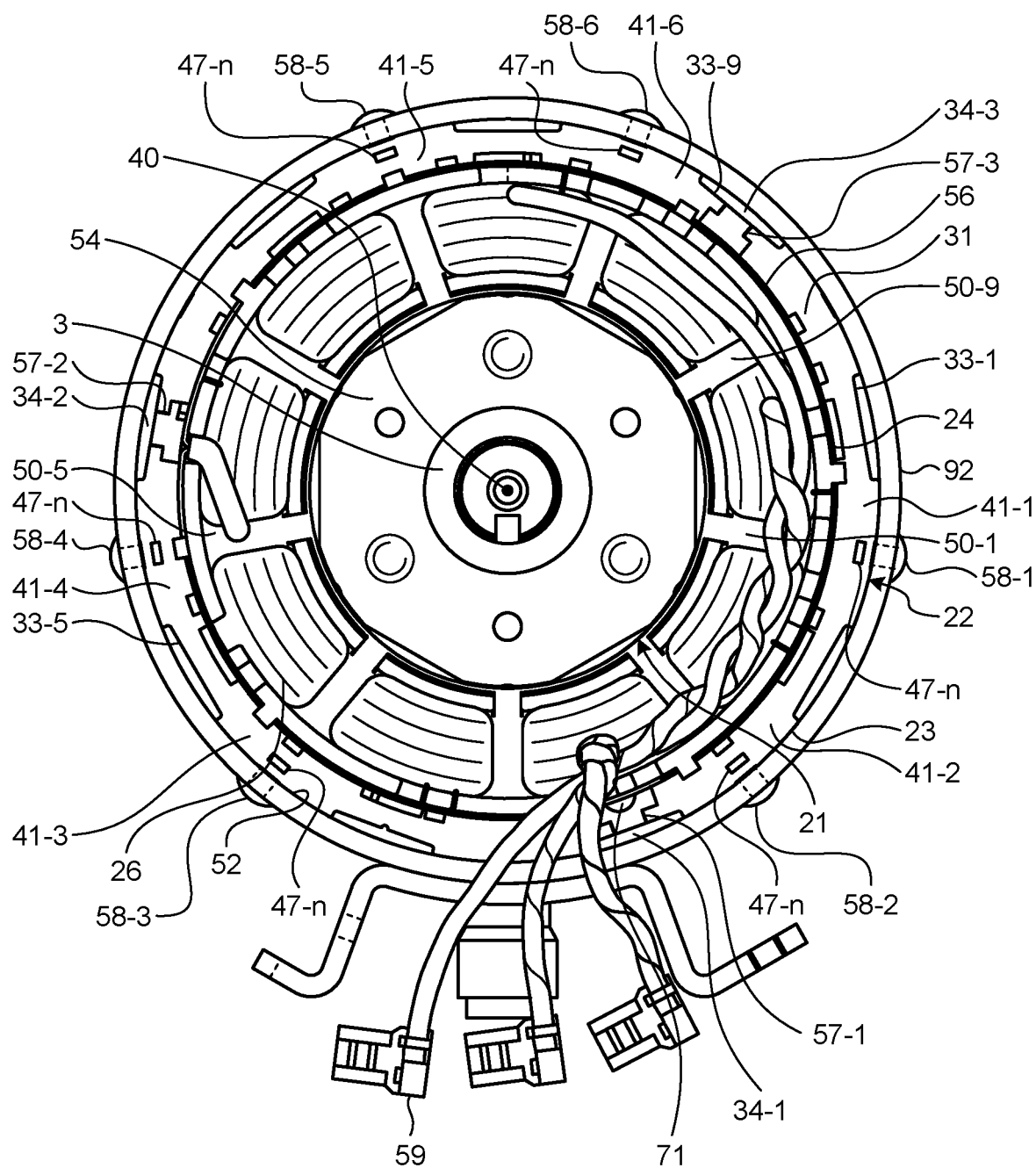
FIG. 7 is a top view of a motor unit and a shell.

FIG. 7 is a top view of the motor unit and the shell. The upper insulator 24 includes an outer circumferential wall 56 and a plurality of claws 57-1 to 57-3 as illustrated in FIG. 7 and includes a plurality of tooth areas that are not illustrated in the drawings. The outer circumferential wall 56 is formed in an approximately cylindrical shape. The outer circumferential wall 56 is formed to be slightly smaller radially than the outer circumference of the yoke 31 of the stator core 23. Thus, the claws 57-1 to 57-3 are formed to protrude from the outer circumferential surface of the outer circumferential wall 56 toward the side of the outer circumference of the yoke 31. The claws 57-1 to 57-3 are respectively engaged with the positioning cutouts 34-1 to 34-3 of the stator core 23, thereby positioning the outer circumferential wall 56 and fixing the outer circumferential wall 56 to the stator core 23. The tooth areas are formed to protrude from the inner circumferential surface of the outer circumferential wall 56 and are formed to cover the upper ends of the teeth 32-1 to 32-9 of the stator core 23. In the upper insulator 24, a mark 71 that specifies one of the tooth areas is further formed.

As the upper insulator 24 does, the lower insulator 25 also includes an outer circumferential wall, a plurality of claws, and a plurality of tooth areas. The tooth areas are formed to cover the lower ends of the teeth 32-1 to 32-9 of the stator core 23, respectively. The claws are respectively engaged with the positioning cutouts 34-1 to 34-3 of the stator fore 23, thereby positioning the outer circumferential wall and fixing the lower insulator 25 to the stator core 23. The mark 71 that specifies one of the tooth areas is further formed also in the lower insulator 25.

In the stator core 23, the coil 26 is wound around the teeth 32-1 to 32-9 via the upper insulator 24 and the lower insulator 25. The upper insulator 24 is partly arranged between the upper ends of the teeth 32-1 to 32-9 and the coil 26 and thus separates the upper ends of the teeth 32-1 to 32-9 and the coil 26. As the upper insulator 24 is, the lower insulator 25 is partly arranged between the lower ends of the teeth 32-1 to 32-9 and the coil 26 and thus separates the lower ends of the teeth 32-1 to 32-9 and the coil 26. The upper insulator 24 and the lower insulator 25 separate the teeth 32-1 to 32-9 and the coil 26 from each other, thereby electrically insulating the teeth 32-1 to 32-9 and the coil 26 from each other.

The stator 22 further includes a lead 59. The lead 59 is electrically connected to the coil 26 and is used to supply an electric current that is supplied from outside the housing 2 to the coil 26. For example, the lead 59 is arranged on the side of the upper end 27 of the third teeth 32-3.

The stator 22 is arranged such that an area in which the cutouts 33-1 to 33-9 are not formed on the outer circumferential surface of the yoke 31 of the stator core 23 closely adhered to the inner wall of the shell 92 of the housing 2. The shell 92 includes a plurality of welding areas 58-1 to 58-6. The welding areas 58-1 to 58-6 are areas where the stator core 23 and the shell 92 are welded by arc welding. Each of the welding areas 58-1 to 58-6 is an area where a welding material (so-called welding rod) and a member to be welded (so-called base material) fuse together by heat and fixed when the stator core 23 is welded on the shell 92 by arc welding. The first welding area 58-1 out of the welding areas 58-1 to 58-6 is formed in an area of the shell 92, which is an area contacting the first swaging fixing area 41-1 of the stator core 23. The second welding area 58-2 out of the welding areas 58-1 to 58-6 is formed in an area of the shell 92, which is an area contacting the second swaging fixing area 41-2 of the stator core 23. The third welding area 58-3 out of the welding areas 58-1 to 58-6 is formed in an area of the shell 92, which is an area contacting the third swaging fixing area 41-3 of the stator core 23. The fourth welding area 58-4 out of the welding areas 58-1 to 58-6 is formed in an area of the shell 92, which is an area contacting the fourth swaging fixing area 41-4 of the stator core 23. The fifth welding area 58-5 out of the welding areas 58-1 to 58-6 is formed in an area of the shell 92, which is an area contacting the fifth swaging fixing area 41-5 of the stator core 23. The sixth welding area 58-6 out of the welding areas 58-1 to 58-6 is formed in an area of the shell 92, which is an area contacting the sixth swaging fixing area 41-6 of the stator core 23. In the welding areas 58-1 to 58-6, each of the swaging fixing areas 41-1 to 41-6 is joined to the shell 92 to fix the stator core 23 to the shell 92. In other words, the stator core 23 is fixed to the shell 92 of the housing 2 via the welding areas 58-1 to 58-6.

Process to Assemble Compressor

Figure 8:
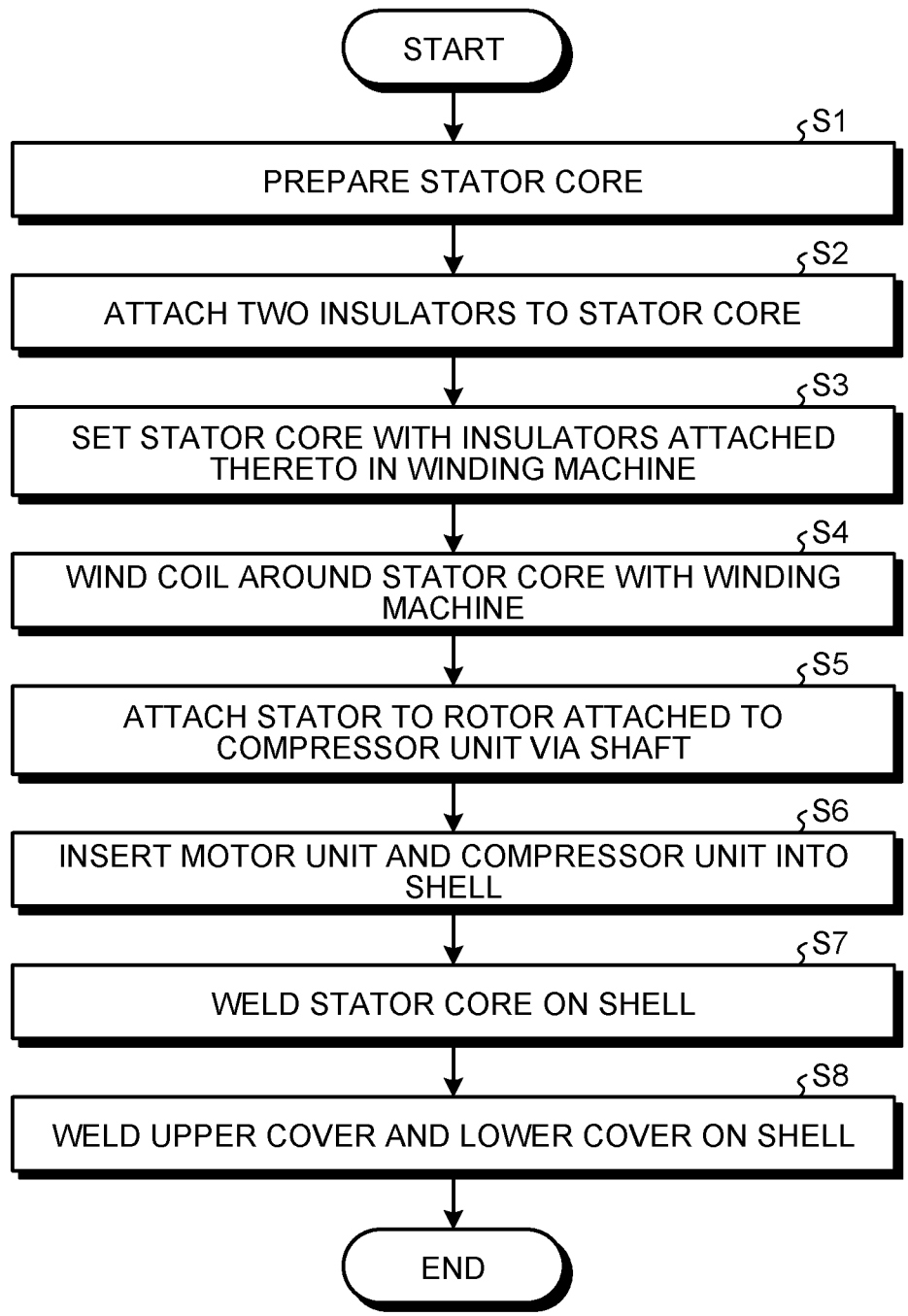
FIG. 8 is a flowchart of operations to assemble a compressor.

FIG. 8 is a flowchart of a process to assemble a compressor. In a process to assemble the compressor 1, as illustrated in FIG. 8, the stator core 23 is prepared (step S1). In other words, the core sheets 45-1 to 45-$n$ are punched out of, for example, a mother coil, which is not illustrated in the drawings, by punching. For example, first of all, the first core sheet 45-1 is punched out of the mother coil and then the second core sheet 45-2 is punched out and is superimposed. The core sheet 45-2 is superimposed onto the core sheet 45-1 such that the swaging area 47-2 is fitted to the cut area 46. Furthermore, the third to n-th core sheets 45-3 to 45-$n$ are punched out sequentially and are sequentially superimposed. The third to n-th core sheets 45-3 to 45-$n$ are superimposed such that the swaging areas 47-2 to 47-$n$ are mutually fitted. As described above, in the swaging fixing areas 41-$a$ to 41-6, the swaging area 47-2 is fitted to the cut area 46 and the swaging areas 47-2 to 47-$n$ are mutually fitted so that the core sheets 45-1 to 45-$n$ are mutually fixed. Accordingly, in the n core sheets 45-1 to 45-$n$, the cut area 46 and the swaging areas 47-2 to 47-$n$ each provided in the swaging fixing areas 41-1 to 41-6 are mutually fixed are thus formed in the stator core 23. Punching out the n core sheets 45-1 to 45-$n$ by punching may form the burr 54 on the edge.

The lower insulator 25 is then attached to the stator core 23 such that the lower insulator 25 is closely adhered to the lower end 28 and the claws 57-1 to 57-3 are engaged with the positioning cutouts 34-1 to 34-3. By checking the end on which the dummy cut areas 48-1 to 48-3 are formed, the operator is able to check the lower end 28 of the stator core 23 and appropriately attach the lower insulator 25 to the lower end 28 of the stator core 23. The upper insulator 24 is then attached to the stator core 23 such that the upper insulator 24 is closely adhered to the upper end 27 and the claws 57-1 to 57-3 are engaged in the positioning cutouts 34-1 to 34-3 (step S2). The marks 71 that are formed on the upper insulator 24 and the lower insulator 25 are aligned vertically.

After the upper insulator 24 and the lower insulator 25 are attached to the stator core 23, the stator core 23 is set in a winding machine with the upper end 27 of the stator core 23 facing down (step S3). By checking the positions in which the dummy cut areas 48-1 to 48-3 are formed, the operator is able to check the position of the upper end 27 of the stator core 23 and appropriately set the stator core 23 in the winding machine with the upper end 27 of the stator core 23 facing down. The stator core 23 is set in the winding machine further with the positioning cutouts 34-1 to 34-3 being oriented in a given direction. By checking the marks 71 that are formed in the upper insulator 24 and the lower insulator 25, the operator is able to appropriately set the stator core 23 in the winding machine with the positioning cutouts 34-1 to 34-3 being oriented in the given direction.

After the stator core 23 is set, the winding machine winds the coil 26 around each of the teeth 32-1 to 32-9 of the stator core 23 (step S4). The coil 26 is wound after the upper insulator 24 and the lower insulator are attached to the stator core 23 so that the stator core 23 is formed in the stator 22.

The compressor unit 5 to which the rotor 21 is attached via the shaft 3 is then prepared. The rotor 21 is inserted into the stator 22 with the upper end 27 of the stator core 23 being placed facing down from the side of the lower end 28 of the stator core 23 (step S5). The rotor 21 is inserted into the stator 22 so that the motor unit 6 is formed.

With the upper end 27 of the stator core 23 being placed facing down, the motor unit 6 and the compressor unit 5 are covered with the shell 92 from the side of the lower end 28 of the stator core 23 and are inserted into given positions in the shell 92 (step S6). When the burr 54 is formed on the edge of the upper end 27 and the shell 92 is put from the side of the upper end 27, the edge of the shell 92 may be hooked by the burr 54 and thus the insertion may be less easy. Putting the shell 92 from the side of the lower end 28 enables insertion of the stator core 23 into the shell 92 smoothly even when a burr remains.

Before the stator core 23 is inserted, a plurality of through-holes are formed in the shell 92. The through-holes are formed in the shell 92 such that the motor unit 6 and the compressor unit 5 are inserted to be in given positions in the shell 92 and accordingly the through-holes correspond respectively to the swaging fixing areas 41-1 to 41-6. The shell 92 and the swaging fixing areas 41-1 to 41-6 are arc-welded through the through-holes after the motor unit 6 and the compressor unit 5 are inserted into the shell 92 and accordingly the stator core 23 is fixed to the shell 92 (step S7). The swaging fixing areas 41-1 to 41-6 are arc-welded on the shell 92 and accordingly the welding areas 58-1 to 58-6 are formed respectively in the positions in which the through-holes are respectively formed in the shell 92.

After the stator core 23 is fixed to the shell 92 by welding, the upper cover 91 and the lower cover 93 are attached to the shell 92 to form the sealed internal space 7 so that the compressor 1 is formed (step S8).

Operations of Compressor

The compressor 1 is provided in a freezing cycle device, which is not illustrated in the drawings, and is used to compress a refrigerant and circulate the refrigerant through the cooling cycle device. In the motor unit 6 of the compressor 1, appropriate application of three-phase voltage to the coil 26 causes the shaft 3 to rotate. In other words, application of three-phase voltage to the coil 26 causes the stator 22 of the motor unit 6 to generate a rotary magnetic field. The rotary magnetic field that is generated by the stator 22 causes the rotor 21 to rotate and accordingly rotate the shaft 3.

When the shaft 3 rotates, the compressor unit 5 sucks the low-pressure refrigerant gas via the suction pipes 11, compresses the taken low-pressure refrigerant gas to generate the high-pressure refrigerant gas and supplies the high-pressure refrigerant gas to the upper muffler chamber 16 and the lower muffler chamber 17. The lower muffler cover 15 reduces pressure pulsation of the high-pressure refrigerant gas that is supplied to the lower muffler chamber 17 and supplies the high-pressure refrigerant gas with the reduced pressure pulsation to the upper muffler chamber 16. The upper muffler cover 14 reduces the pressure pulsation of the high-pressure refrigerant gas that is supplied to the upper muffler chamber 16 and supplies the high-pressure refrigerant gas with the reduced pressure pulsation to a space under the motor unit 6 in the internal space 7 via the compressed refrigerant ejection hole 18.

The high-pressure refrigerant gas that is ejected from the compressed refrigerant ejection hole 18 is supplied to a space above the motor unit 6 in the internal space 7 via the gap between the rotor 21 and the stator 22 and further via the slots 50-1 to 50-9 and the cutouts 33-1 to 33-9. The refrigerant that is supplied to the space above the motor unit 6 in the internal space 7 is ejected to the latter device with respect to the cooling cycle device via the discharge pipe 12.

Effects of Compressor of First Embodiment

The compressor 1 of first embodiment includes the shaft 3, the motor unit 6 that causes the shaft 3 to rotate, the compressor unit 5 that compresses the refrigerant according to the rotation of the shaft 3, and the housing 2 that stores therein the shaft 3, the motor unit 6, and the compressor unit 5. The housing 2 and the motor unit 6 are joined by welding in the welding areas 58-1 to 58-6. The motor unit 6 includes the rotor 21 that is fixed to the shaft 3 and the stator core 23 that surrounds the rotor 21. The stator core 23 is formed by superimposing the core sheets 45-1 to 45-n. The stator core 23 includes the teeth 32-1 to 32-9 and the swaging fixing areas 41-1 to 41-6. The coil 26 is wound around the teeth 32-1 to 32-9. The swaging fixing areas 41-1 to 41-6 are areas where the swaging areas 47-2 to 47-n are provided to fix the core sheets 45-1 to 45-n mutually. The core sheets 45-1 to 45-n are mutually fixed in the swaging fixing areas 41-1 to 41-6 and accordingly the swaging fixing areas 41-1 to 41-6 have rigidity higher than that of other areas and thus is less deformable. The welding areas 58-1 to 58-6 are formed in only positions corresponding to the swaging fixing areas 41-1 to 41-6. In other words, the welding areas 58-1 to 58-6 are not formed in areas different from the swaging fixing areas 41-1 to 41-6 but formed in the swaging fixing areas 41-1 to 41-6 and thus the stator core 23 is fixed to the housing 2. In other words, in the stator core 23, welding the swaging fixing areas 41-1 to 41-6 whose rigidity is increased by fixing the core sheets 45-1 to 45-n mutually on the housing 2 makes it possible to reduce deformation of the welding areas.

When areas where the swaging fixing areas 41-1 to 41-6 are not arranged in the stator core 23 are welded on the housing 2, the welding areas may deform in the core sheets 45-1 to 45-n. In the stator core 23, deformation of the core sheets 45-1 to 45-n may increase the electromagnetic resistance and accordingly increase the loss in the magnetic circuit. In the compressor 1 of first embodiment, areas different from the swaging fixing areas 41-1 to 41-6 in the stator core 23 are not welded on the housing 2 and this makes it possible to reduce deformation of the core sheets 45-1 to 45-n. In the compressor 1, reducing deformation of the core sheets 45-1 to 45-n makes it possible to reduce the electromagnetic resistance of the stator core 23. In the compressor 1, reducing the electromagnetic resistance of the stator core 23 makes it possible to compress the refrigerant highly efficiently.

In the stator core 23 of the compressor 1 of first embodiment, the number of the swaging fixing areas 41-1 to 41-6 is smaller than the number of the teeth 32-1 to 32-9.

In the compressor 1, the number of the swaging fixing areas 41-1 to 41-6 is smaller than that of the teeth 32-1 to 32-9. Thus, compared to the case where the number of the swaging fixing areas 41-1 to 41-6 is equal to the number of the teeth 32-1 to 32-9, it is possible to reduce deformation of the core sheets 45-1 to 45-n (deformation resulting from formation of swaging areas). In the compressor 1, reducing deformation of the core sheets 45-1 to 45-n makes it possible to reduce the electromagnetic resistance of the stator core 23. In the compressor 1, reducing the electromagnetic resistance of the stator core 23 makes it possible to compress the refrigerant highly efficiently.

In the compressor 1 of first embodiment, the number of the swaging fixing areas 41-1 to 41-6 is smaller than that of the teeth 32-1 to 32-9; however, the swaging fixing areas 41-1 to 41-6 larger in number than the teeth 32-1 to 32-9 may be formed. In the compressor 1, even when the swaging fixing areas 41-1 to 41-6 are more than the teeth 32-1 to 32-9, areas other than the swaging fixing areas 41-1 to 41-6 are not welded on the housing 2 and this makes it possible to reduce the electromagnetic resistance of the stator core 23. In first embodiment, all the swaging fixing areas 41-1 to 41-6 are welded on the housing 2; however, the present invention is not limited thereto. For example, some of the swaging fixing areas may be welded on the housing 2. In short, it suffices if the fixing power for fixing the stator core 23 to the housing 2 can be ensured.

In the stator core 23 of the compressor 1 of first embodiment, the dummy cut areas 48-1 to 48-3 and the positioning cutouts 34-1 to 34-3 are further formed. The dummy cut areas 48-1 to 48-3 specify the vertical direction of the stator core 23 when the direction parallel to the axis 40 on which the shaft 3 rotates is the vertical direction. The positioning cutouts 34-1 to 34-3 specify the direction orthogonal to the axis 40.

When the stator core 23 is formed without line symmetry with respect to any of straight lines orthogonal to the axis 40 and the direction parallel to the axis 40 is inappropriate (in other words, when the stator core 23 is inverted vertically), even when the direction orthogonal to the axis 40 is appropriate, the swaging fixing areas 41-1 to 41-6 do not necessarily correspond to the welding areas d. On the other hand, in the compressor 1 of first embodiment, for example, forming the dummy cut areas 48-1 to 48-3 enables the operator to check by sight the upper end 27 and the lower end 28 of the stator core 23 even when the stator core 23 does not have linearly symmetry and thus determine the vertical direction in the stator core 23. Accordingly, the operator is able to insert the stator core 23 into the shell 92 appropriately. In the compressor 1, the stator core 23 is inserted into the shell 92 properly and thus the stator core 23 can be properly fixed to the housing 2 such that the welding areas 58-1 to 58-6 are formed in appropriate positions.

In the core sheets 45-1 to 45-n of the compressor 1 of first embodiment, the dummy cut areas 48-1 to 48-3 are formed in the core sheet 45-1; however, other determination areas may be formed in the stator core 23. As the determination areas, the marks that are formed at the upper end 27 are exemplified. In the compressor 1, formation of the determination areas enables the operator to check the upper end 27 and the lower end 28 of the stator core 23 and appropriately insert the stator core 23 into the shell 92. The determination areas that are formed in the stator core 23 are not limited to ones formed at the upper end 27 and the lower end 28. In short, it suffices if the vertical direction in the stator core 23 can be specified and thus it suffices if the determination areas are formed on a side of the upper end or the lower end of the stator core 23. Accordingly, for example, determination areas may be formed in a core sheet (such as the core sheet 45-2) adjacent to the upper end or the lower end. In this case, to make the determination areas viewable even after the n core sheets are superimposed, for example, the determination areas may be formed on the outer circumference of the core sheet 45-2.

The welding areas 58-1 to 58-6 are formed respectively in all the swaging fixing areas 41-1 to 41-6 and thus the stator core 23 of the compressor 1 of first embodiment is fixed to the housing 2. In other words, the stator core 23 is fixed to the housing 2 because all the swaging fixing areas 41-1 to 41-6 are welded on the housing 2. In the compressor 1, the number of swaging fixing areas can be smaller than that in a compressor in which swaging areas larger in number than the welding areas are provided. As described above, fixing the stator core 23 to the shell 92 without any swaging fixing area being not welded on the shell 92 out of the swaging fixing areas 41-1 to 41-6 makes it possible to reduce the number of the swaging fixing areas 41-1 to 41-6. In the compressor 1, reducing the number of the swaging fixing areas 41-1 to 41-6 makes it possible reduce deformation of the core sheets 45-1 to 45-n (deformation due to formation of swaging areas). In the compressor 1, reducing deformation of the core sheets 45-1 to 45-n makes it possible to reduce the electromagnetic resistance of the stator core 23. In the compressor 1, reducing the electromagnetic resistance of the stator core 23 makes it possible to compress the refrigerant highly efficiently.

The upper insulator 24 and the lower insulator 25 of the compressor 1 of first embodiment are formed, not covering the dummy cut areas 48-1 to 48-3 of the stator core 23, but may be formed to cover the dummy cut areas 48-1 to 48-3. In this case, for example, the upper insulator 24 and the lower insulator 25 may be formed such that the appearance of the upper insulator 24 may be different from the appearance of the lower insulator 25. For example, a mark representing that it is the upper insulator 24 may be formed on the upper insulator 24. Alternatively, the upper insulator 24 may be formed of a material different from that of the lower insulator 25.

In the compressor 1 in which such an upper insulator is provided, even when the dummy cut areas 48-1 to 48-3 of the stator core 23 are covered, the operator is able to check the upper end 27 and the lower end 28 of the stator core 23. The operator is able to check the upper end 27 and the lower end 28 of the stator core 23 and thus is able to appropriately set the stator core 23 in the winding machine and appropriately insert the stator core 23 into the shell 92.

Second Embodiment

Figure 9:
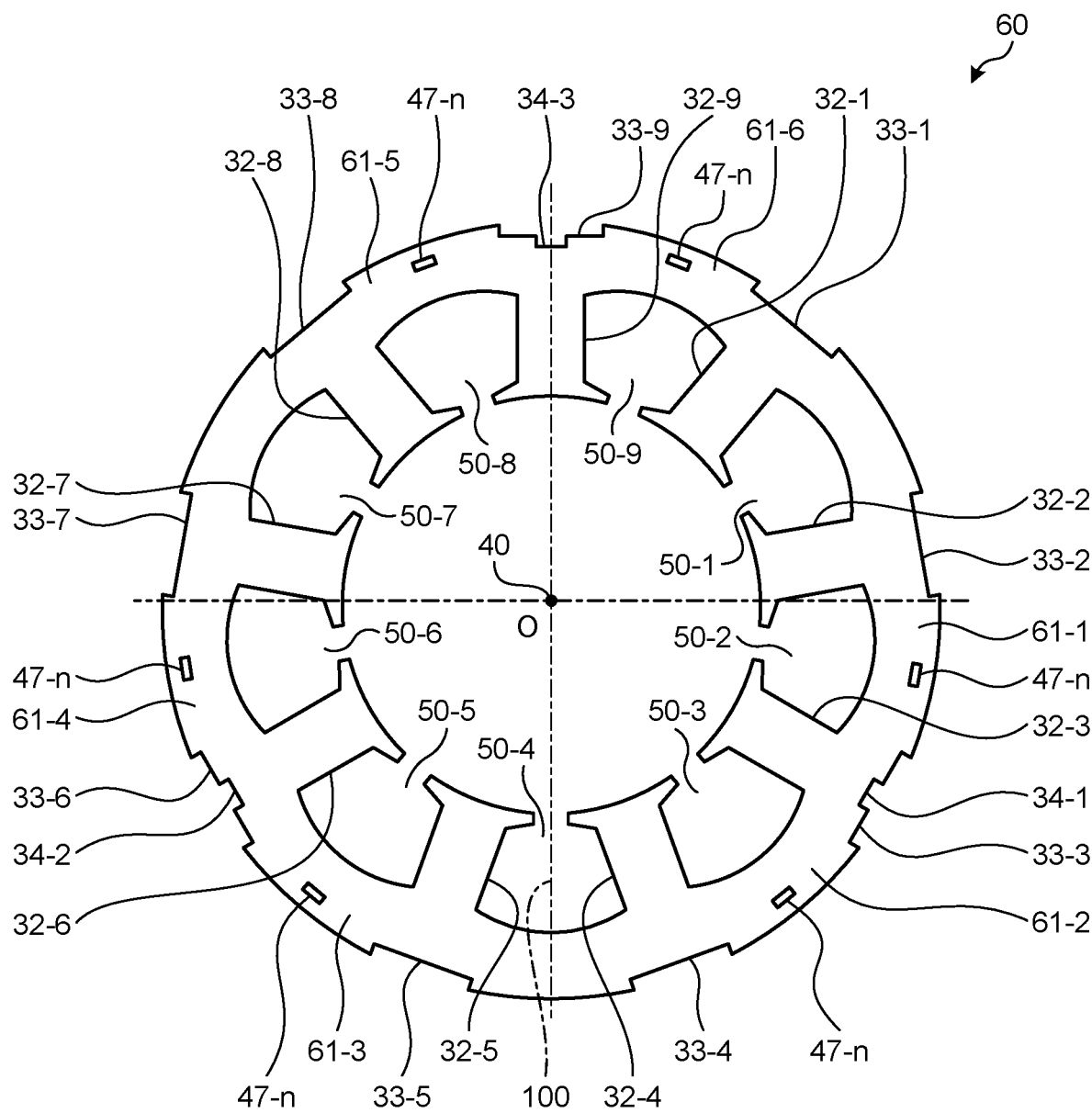
FIG. 9 is a top view of a stator core of a compressor of second embodiment.

In the stator core 23 of the compressor 1 of first embodiment, the swaging fixing areas 41-1 to 41-6 are not arranged to have reflection symmetry with respect to the plane 100 (in other words, formed to have reflection asymmetry with respect to the plane 100); however, the swaging fixing areas 41-1 to 41-6 may be formed to have reflection symmetry with respect to the plane 100. FIG. 9 is a top view of a stator core of a compressor of second embodiment. As illustrated in FIG. 9, as the stator core 23 of the compressor 1 of the above-described first embodiment does, a stator core 60 of the compressor of second embodiment includes the yoke 31 and the teeth 32-1 to 32-9. In the stator core 60, as in the above-described stator core 23, the cutouts 33-1 to 33-9, the positioning cutouts 34-1 to 34-3, and the slots 50-1 to 50-9 are formed.

In the yoke 31, as in first embodiment, the swaging areas 47-2 to 47-n are formed (see FIG. 4). The spots where the swaging areas 47-2 to 47-n are formed in the yoke 31 are referred to as swaging fixing areas 61-1 to 61-6. The first swaging fixing area 61-1 out of the swaging fixing areas 61-1 to 61-6 is formed on a side of the outer circumference of the second slot 50-2 in the yoke 31. The second swaging fixing area 61-2 out of the swaging fixing areas 61-1 to 61-6 is formed on a side of the outer circumference of the third slot 50-3 in the yoke 31. The third swaging fixing area 61-3 out of the swaging fixing areas 61-1 to 61-6 is formed on a side of the outer circumference of the fifth slot 50-5 in the yoke 31. The fourth swaging fixing area 61-4 out of the swaging fixing areas 61-1 to 61-6 is formed on a side of the outer circumference of the sixth slot 50-6 in the yoke 31. The fifth swaging fixing area 61-5 out of the swaging fixing areas 61-1 to 61-6 is formed on a side of the outer circumference of the eighth slot 50-8 in the yoke 31. The sixth swaging fixing area 61-6 out of the swaging fixing areas 61-1 to 61-6 is formed on a side of the outer circumference of the ninth slot 50-9 in the yoke 31.

In a k-th swaging fixing area 61-$k$ of the stator core 60, a cut area and a plurality of swaging areas are fitted and accordingly a plurality of core sheets forming the stator core 60 are mutually positioned and the core sheets are mutually fixed.

The stator core 60 is formed as described above and thus is formed to have reflection symmetrically with respect to the plane 100. For example, the sixth swaging fixing area 61-6 and the fifth swaging fixing area 61-5 are arranged in positions realizing plane symmetry with respect to the plane 100. In other words, after the upper end 27 and the lower end 28 of the stator core 60 are inverted, when the third positioning cutout 34-3 is arranged to overlap the position in which the third positioning cutout 34-3 is originally arranged, the sixth swaging fixing area 61-6 is arranged in the position where the fifth swaging fixing area 61-5 is arranged originally.

A plurality of through-holes are formed in the shell 92, which are though holes that correspond respectively to the swaging fixing areas 61-1 to 61-6 when the stator core 60 is inserted into the shell 92 such that the positioning cutouts 34-1 to 34-3 are arranged in given positions.

In the compressor of second embodiment, as in the above-described compressor 1, welding the swaging fixing areas 61-1 to 61-6 of the stator core 60 on the shell 92 prevents the magnetic resistance of the stator core 60 from increasing. In the compressor of second embodiment, preventing the magnetic resistance of the stator core 60 makes it possible to compress a refrigerant highly efficiently.

Forming the stator core 60 with reflection symmetry with respect to the plane 100 enables the swaging fixing areas 61-1 to 61-6 to be arranged to correspond to the through-holes in the shell 92 even when the stator core 60 is inserted into the shell with the upper end 27 and the lower end 28 being inverted.

REFERENCE SIGNS LIST

1 COMPRESSOR
2 HOUSING
3 SHAFT
5 COMPRESSOR UNIT
6 MOTOR UNIT
21 ROTOR
22 STATOR
23 STATOR CORE
24 UPPER INSULATOR
25 LOWER INSULATOR
26 COIL
31 YOKE
32-1 TO 32-9 TEETH
33-1 TO 33-9 CUTOUTS
34-1 TO 34-3 POSITIONING CUTOUTS
40 AXIS
41-1 TO 41-6 SWAGING FIXING AREAS
45-1 TO 45-$n$ CORE SHEETS
46 CUT AREA
47-2 TO 47-$n$ SWAGING AREAS
48-1 TO 48-3 DUMMY CUT AREAS
58-1 TO 58-6 WELDING AREAS

The invention claimed is:

1. A compressor comprising:
a shaft;
a motor unit that causes the shaft to rotate;
a compressor unit that compresses a refrigerant according to rotation of the shaft; and
a housing that stores therein the shaft, the motor unit, and the compressor unit,
wherein
the housing and the motor unit are joined by welding in a plurality of welding areas,
the motor unit includes:
a rotor that is fixed to the shaft; and
a stator core that surrounds the rotor,
a plurality of core sheets are superimposed in the stator core and the stator core includes a plurality of teeth around which a coil is wounded and a plurality of swaging fixing areas where swaging areas fix the core sheets mutually,
the welding areas are formed in only positions corresponding to the swaging fixing areas, and
the motor unit further includes:
a vertical direction determination unit that, when a direction that is parallel to an axis on which the shaft rotates is a vertical direction, enables determination of the vertical direction; and
a circumferential direction determination unit that enables determination of a direction that is perpendicular to the shaft.

2. The compressor according to claim 1, wherein the number of the swaging fixing areas is smaller than that of the teeth.

3. The compressor according to claim 2, wherein a core sheet on a side of an upper-end in the vertical direction out of the core sheets has a shape different from that of a core sheet on a side of a lower end.

4. The compressor according to claim 2, wherein
the motor unit further includes:
a first insulator that is arranged on a side of one end of the stator core; and
a second insulator that is arranged on a side of the other end of the stator core, and
the first insulator and the second insulator are formed so that the vertical direction determination unit is not covered by the first insulator and the second insulator.

5. The compressor according to claim 1, wherein the welding areas are formed respectively in positions corresponding to all the swaging fixing areas in the stator core.

* * * * *